United States Patent [19]

Nagai

[11] 4,390,914
[45] Jun. 28, 1983

[54] TAPE CASSETTE AND SOUND RECORDING AND REPRODUCING APPARATUS FOR USE THEREFOR

[76] Inventor: Shinichi Nagai, 17-2, Kitanakafuri 3-chome, Hirakata-shi, Osaka-fu 573, Japan

[21] Appl. No.: 229,507

[22] Filed: Jan. 29, 1981

[51] Int. Cl.³ .................. G11B 23/04; G03B 1/04; G11B 23/46; G11B 15/60
[52] U.S. Cl. ............................. 360/96.5; 360/132; 360/3; 242/200
[58] Field of Search .................. 360/3, 96.5, 131, 132, 360/96.1, 134; 242/197, 198, 199, 200

[56] References Cited

U.S. PATENT DOCUMENTS

| | | | |
|---|---|---|---|
| 3,871,754 | 3/1975 | Procop | 360/3 |
| 4,014,042 | 3/1977 | Schoettle | 360/132 |
| 4,123,789 | 10/1978 | Shatavsky | 360/132 |
| 4,257,075 | 3/1981 | Wysocki | 360/96.5 |
| 4,306,690 | 12/1981 | Izaki | 360/132 |

Primary Examiner—Robert M. Kilgore
Attorney, Agent, or Firm—Birch, Stewart, Kolasch & Birch

[57] ABSTRACT

A tape cassette having a form and shape wherein the left end portion is asymmetrical from the right end portion and the upper end portion is asymmetrical from the lower end portion. A recording and a reproducing apparatus are designed for exclusive use of the tape cassette having the features presented hereinabove, each of said apparatus containing one or more chambers for accommodating the tape cassette.

5 Claims, 3 Drawing Figures

TAPE CASSETTE AND SOUND RECORDING AND REPRODUCING APPARATUS FOR USE THEREFOR

BACKGROUND AND SUMMARY OF THE INVENTION

The present invention relates to a tape cassette and a sound recording and a reproducing apparatus for exclusive use for the tape cassette. More particularly, the present invention relates to a tape cassette having a shape in variation in which the right end portion is asymmetrical from the left end portion and the upper end portion is asymmetrical from the lower end portion. The present invention is also concerned with a sound recording and reproducing apparatus for exclusive use with such a tape cassette.

Conventional tape cassettes are constructed so that both sides thereof are usable. When one side is completed, the tape cassettes are then turned over. They have rectangular shapes. In other words, they are symmetrical on both the right and left end portions and the upper and lower end portions. Accordingly, it is necessary to determine the right position and side of the tape cassettes for loading in a recording and reproducing apparatus. It is thus disadvantageous to load the tape cassettes quickly when a prompt operation is required or to load the tape cassettes in a dark place. It is also inconvenient for the young, the old and the physically handicapped to load the tape cassette in a conventional recording and reproducing apparatus.

Therefore, it is an object of the present invention to provide a tape cassette in a novel form particularly adaptable to overcome inconveniences and disadvantages caused by conventional tape cassettes.

It is another object of the present invention to provide a tape cassette which is asymmetrical in shape on both the right and left end portions and on the upper and lower end portions thereof.

It is a further object of the present invention to provide a tape cassette for exclusive use for one side recording.

It is still a further object of the present invention to provide a recording apparatus and a reproducing apparatus for exclusive use for loading therein such a tape cassette.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS OF THE INVENTION

The tape cassette according to the present invention is particularly characterized in that it is in a shape arranged in an asymmetrical relationship with respect to the right and left end portions and the upper and lower end portions.

Figure 1:
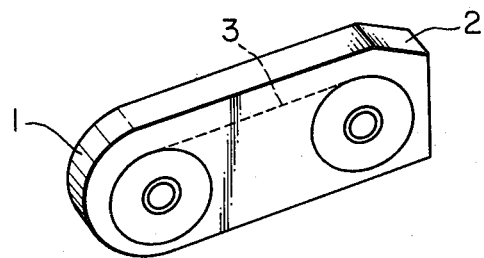
FIG. 1 is a perspective view illustrating one example of the tape cassette in a varied form according to the present invention.

Referring to FIG. 1, the tape cassette has a semicircular shape at one end portion 1, and the other end portion has two corners, one of which, i.e., the upper corner portion 2, has an oblique configuration and the other corner, i.e., the lower corner portion, has a substantially right angle configuration. However, the shape of the tape cassette according to the present invention is not restricted to that described hereinabove and illustrated in FIG. 1 but may be any configuration as long as the shape is adaptable to the objects of the present invention. For example, the end portion 1 may have a shape wherein it is cut at right angles with respect to the upper and lower peripheral lines. Alternatively, the upper corner portion 2 as provided on the right end portion in FIG. 1 may be disposed at the lower corner portion thereof. In FIG. 1, element 3 shows a tape.

The tape cassette according to the present invention may be arranged so as to be operated exclusively for one side recording, whereby its operation may be rendered extremely easy. However a tape housed in the tape cassette is of the same structure and of the same material as conventional tapes. Thus only the tape cassette varies in form and shape. The tape cassette according to the present invention may be manufactured in the same manner as conventional ones.

The tape cassette according to the present invention may be operated easier by using a short length tape. Accordingly it is preferred to determine appropriate tape length, in accordance with any desired use.

The shape of the tape cassette according to the present invention varies from the conventional tape cassette. Accordingly it is impossible to load the tape cassette according to the present invention in conventional recording and reproducing apparatus. The tape cassette according to the present invention can fully exhibit its objects when combined with a recording or a reproducing apparatus which can be used exclusively therefor.

Figure 2:
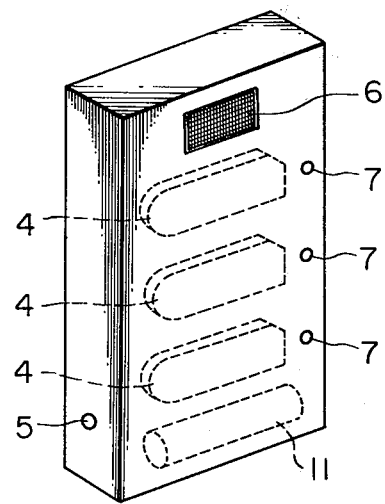
FIG. 2 is a perspective view illustrating one example of the recording apparatus exclusively usable for loading the tape cassette according to the present invention.

FIG. 2 illustrates one example of the recording apparatus according to the present invention. This recording apparatus has a plurality of chambers 4 into which the tape cassettes according to the present invention can be loaded. This allows a quick reaction against a short recording time in the case where the length of the tape housed in the tape cassette is too short. Conversely, where the recording time for a particular tape cassette according to the present invention is longer, the number of chambers for loading the tape cassettes can be reduced, and thus only one chamber may be required in some cases.

The recording apparatus according to the present invention has a structure which is not substantially different from conventional recording apparatus. Accordingly it can be manufactured in a conventional manner.

In FIG. 2, the numeral 5 is a connecting terminal for connection, for example, to an external microphone; the numeral 6 is a built-in microphone; the numeral 7 is a switch; and the numeral 11 is a battery.

The shape of the chamber in the recording apparatus according to the present invention is not restricted to the particular shape as illustrated in FIG. 2 and described hereinabove with respect to the shape of the tape cassette and may have any shape as long as it is advantageously adaptable to load the tape cassette according to the present invention.

Figure 3:
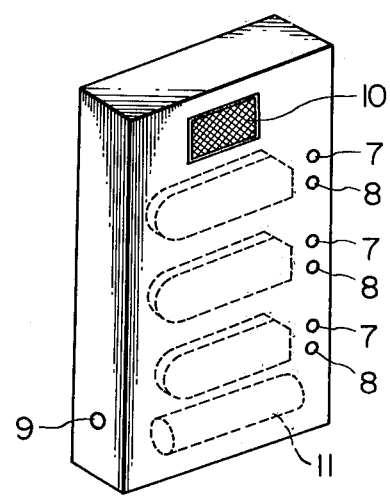
FIG. 3 is a perspective view illustrating one example of the reproducing apparatus exclusively usable for loading the tape cassette according to the present invention.

FIG. 3 illustrates one example of the reproducing apparatus according to the present invention for exclusive use for the tape cassette in such a shape as described hereinabove.

The reproducing apparatus has substantially the same structure and function as conventional reproducing apparatus, and it has one or a plurality of chambers into which the tape cassette according to the present invention can be loaded. In the same manner as in the recording apparatus adapted to load the tape cassette or cassettes according to the present invention, there is provided a switch 7 and a rewinding switch 8 corresponding to each chamber for loading the tape cassette. In FIG. 3, the numeral 9 is a connecting terminal for an earphone, numeral 10 is a speaker, and numeral 11 is a battery.

In accordance with the present invention, the tape cassette having the characteristics as presented hereinabove can offer advantages from its unique shape in that it can be loaded into the recording or reproducing apparatus quickly and easily without error, even in dark places. Also, those lacking mechanical knowledge or experience can handle the tape cassette without difficulty. The tape cassette according to the present invention is constructed so as to be adaptable for only one side recording, whereby its operation is rendered simple and therefore can be advantageously used anywhere and anytime. As a convenience for our modern information-oriented era the tape length can be shortened to reduce the recording time, for example, to three minutes to handle memoranda and the like.

The recording and the reproducing apparatus according to the present invention are separated from each other so that they can offer the advantages that they can be handled in a simple, quick and easy manner. They may be operated simultaneously to record some information on one cassette tape and at the same time to reproduce other information recorded on another cassette tape. Also, dubbing is possible by the simultaneous use of the recording and reproducing apparatus. Furthermore, the division of the recording and reproducing system and function into two separate apparatus can provide a smaller and lighter weight device when compared to conventional recording and reproducing cassette tape recorders so that they are convenient to carry, thereby achieving the objects of the present invention and rendering the structures of the two apparatus simpler, with a reduced cost of manufacture.

The tape cassette, the recording apparatus, and the reproducing apparatus according to the present invention are also convenient and easy to handle when they are connected to a handset of a telephone as a composite unit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tape cassette comprising a housing having a semi-circular shape on either of the left or right sides thereof with angular corners on the other of said left or right sides with either the upper or lower corner of said angular corners being obliquely cropped such that said tape cassette is oriented, both from the left to the right and in such a manner such that said cassette cannot be inserted in an upside-down manner.

2. A recording apparatus for the exclusive use of the tape cassette of claim 1, comprising a housing having at least one chamber designed to front or top load said tape cassette.

3. A reproducing apparatus for the exclusive use of the tape cassette of claim 1, comprising a housing having at least one chamber designed to front or top load said tape cassette.

4. A recording apparatus for the exclusive use of the tape cassette of claim 1, comprising a housing having multiple receptacles for receiving as top or front loading said tape cassette.

5. A reproduction apparatus for the exclusive use of the tape cassette of claim 1, comprising a housing having multiple receptacles for receiving as top or front loading said tape cassette.

* * * * *